United States Patent
Weinrauch et al.

(10) Patent No.: US 11,737,426 B2
(45) Date of Patent: Aug. 29, 2023

(54) MOTION POWERED PET TRACKER SYSTEM AND METHOD

(71) Applicant: Trupanion, Inc., Seattle, WA (US)

(72) Inventors: Steven Adam Weinrauch, Seattle, WA (US); Sultan Jumayev, Eindhoven (NL); Frans Vromans, Eindhoven (NL)

(73) Assignee: Trupanion, Inc., Seattle, WA (US)

( * ) Notice: Subject to any disclaimer, the term of this patent is extended or adjusted under 35 U.S.C. 154(b) by 0 days.

(21) Appl. No.: 17/004,737

(22) Filed: Aug. 27, 2020

(65) Prior Publication Data

US 2021/0022318 A1    Jan. 28, 2021

Related U.S. Application Data

(63) Continuation of application No. 16/211,165, filed on Dec. 5, 2018, now Pat. No. 10,785,957, which is a continuation-in-part of application No. 15/833,708, filed on Dec. 6, 2017, now abandoned.

(51) Int. Cl.
*A01K 11/00* (2006.01)
*A01K 27/00* (2006.01)

(52) U.S. Cl.
CPC .......... *A01K 11/008* (2013.01); *A01K 27/006* (2013.01)

(58) Field of Classification Search
CPC .... A01K 11/008; A01K 27/009; G08B 25/10; G08B 19/181
USPC ...................................... 340/539.13
See application file for complete search history.

(56) References Cited

U.S. PATENT DOCUMENTS

| | | | |
|---|---|---|---|
| 6,271,757 B1* | 8/2001 | Touchton | A01K 15/023 119/908 |
| 6,768,246 B2* | 7/2004 | Pelrine | F04B 17/00 310/317 |
| 7,123,153 B2 | 10/2006 | Thorstensen et al. | |
| 7,411,492 B2 | 8/2008 | Greenberg et al. | |
| 7,420,473 B2 | 9/2008 | Eicken et al. | |
| 7,652,386 B2* | 1/2010 | Donelan | F03G 5/00 623/24 |
| 7,864,057 B2 | 1/2011 | Milnes et al. | |
| 8,531,294 B2* | 9/2013 | Slavin | G08B 25/008 340/568.1 |

(Continued)

FOREIGN PATENT DOCUMENTS

| CN | 205511537 U | 8/2016 |
|---|---|---|
| CN | 106455520 A | 2/2017 |

(Continued)

OTHER PUBLICATIONS

Article: Top 15 Best Dog GPS Collars and Trackers, by Patrick Lumontod, dated Apr. 18, 2017, https://topdogtips.com/best-dog-gps-collar/, printed Dec. 6, 2017, 19 pages.

(Continued)

*Primary Examiner* — Omar Casillashernandez
(74) *Attorney, Agent, or Firm* — Wilson Sonsini Goodrich & Rosati

(57) ABSTRACT

A pet tracking device, system and method using a kinetic motion energy generator to generate electrical energy that is used to power a pet tracking mechanism are provided. The pet tracking device may include a housing on a wearable item, such as a collar, attached to the pet or may be injected underneath the skin of the pet.

20 Claims, 8 Drawing Sheets

(56) References Cited

U.S. PATENT DOCUMENTS

| | | | |
|---|---|---|---|
| 9,894,884 B2* | 2/2018 | Hill | A01K 29/005 |
| 9,964,623 B1* | 5/2018 | de la Broise | G06N 5/043 |
| 10,785,957 B2 | 9/2020 | Weinrauch et al. | |
| 2001/0011954 A1* | 8/2001 | Shelton | G01S 5/06 |
| | | | 340/12.23 |
| 2002/0003493 A1 | 1/2002 | Durst et al. | |
| 2005/0265272 A1 | 12/2005 | Thorstensen et al. | |
| 2006/0202818 A1 | 9/2006 | Greenberg et al. | |
| 2008/0276879 A1* | 11/2008 | Marsh | A01K 15/023 |
| | | | 119/719 |
| 2009/0182207 A1 | 7/2009 | Riskey et al. | |
| 2009/0309709 A1* | 12/2009 | Bevacqua | H04W 12/126 |
| | | | 340/426.18 |
| 2010/0240404 A1 | 9/2010 | McCrosky | |
| 2011/0205358 A1* | 8/2011 | Aota | G01S 19/23 |
| | | | 348/143 |
| 2012/0161964 A1 | 6/2012 | Rettedal et al. | |
| 2012/0206296 A1* | 8/2012 | Wan | G01S 19/34 |
| | | | 342/357.31 |
| 2013/0109342 A1 | 5/2013 | Welch et al. | |
| 2013/0285815 A1* | 10/2013 | Jones, II | A01K 11/008 |
| | | | 340/573.3 |
| 2014/0020635 A1* | 1/2014 | Sayers | A01K 15/021 |
| | | | 348/143 |
| 2014/0189015 A1* | 7/2014 | Chan | G06Q 10/107 |
| | | | 709/204 |
| 2014/0266736 A1* | 9/2014 | Cretu-Petra | A61B 5/6808 |
| | | | 340/573.5 |
| 2014/0269467 A1 | 9/2014 | Samanta et al. | |
| 2015/0040840 A1* | 2/2015 | Muetzel | A01K 11/008 |
| | | | 342/450 |
| 2016/0020682 A1 | 1/2016 | Shastry et al. | |
| 2016/0044897 A1* | 2/2016 | Waymouth | A01K 29/005 |
| | | | 340/573.3 |
| 2016/0150362 A1 | 5/2016 | Shaprio et al. | |
| 2016/0203703 A1 | 7/2016 | Graeve et al. | |
| 2016/0205894 A1* | 7/2016 | Kim | A01K 29/005 |
| 2016/0205898 A1 | 7/2016 | Perrine et al. | |
| 2016/0338000 A1 | 11/2016 | Halla et al. | |
| 2017/0059688 A1* | 3/2017 | Gan | G01S 3/325 |
| 2017/0086425 A1 | 3/2017 | Bianchi et al. | |
| 2017/0258043 A1* | 9/2017 | Bianchi | G01S 19/34 |
| 2017/0293033 A1 | 10/2017 | Macz | |
| 2017/0360004 A1* | 12/2017 | Carver | A01K 27/001 |
| 2018/0035640 A1* | 2/2018 | Lasher | G06K 7/10297 |
| 2020/0252876 A1* | 8/2020 | Yeon | H04W 52/0254 |

FOREIGN PATENT DOCUMENTS

| | | |
|---|---|---|
| JP | H06237664 A | 8/1994 |
| JP | 2004095967 A | 3/2004 |
| JP | 2017529058 A | 10/2017 |
| WO | WO-2011094824 A1 | 8/2011 |
| WO | WO-2014142162 A1 | 9/2014 |
| WO | WO-2019113256 | 6/2019 |

OTHER PUBLICATIONS

Co-pending U.S. Application No. 201715833708, inventor Weinrauch; Steve, filed on Dec. 6, 2017.

HomeAgain® Whitepaper: Pet Microchips: High-Tech Protection Helps Find Lost Pets, © 2010 Intervet International B.V., http://public.homeagain.com/pdf/microchipping-whitepaper.pdf, printed Dec. 6, 2017, 9 pages.

International search report with written opinion dated Feb. 12, 2019 for PCT/US2018/064138.

Office action dated Apr. 8, 2019 for U.S. Appl. No. 15/833,708.

Office action dated Oct. 9, 2019 for U.S. Appl. No. 16/211,165.

U.S. Appl. No. 16/211,165 Notice of Allowance dated Aug. 19, 2020.

U.S. Appl. No. 16/211,165 Notice of Allowance dated Aug. 3, 2020.

U.S. Appl. No. 15/833,708 Office Action dated Feb. 1, 2018.

U.S. Appl. No. 15/833,708 Office Action dated Sep. 10, 2018.

U.S. Appl. No. 15/833,708 Office Action dated Oct. 22, 2019.

U.S. Appl. No. 16/211,165 Notice of Allowance dated Mar. 26, 2020.

U.S. Appl. No. 16/211,165 Office Action dated Jul. 14, 2020.

EP18885087.9 Extended European Search Report dated Jul. 20, 2021.

* cited by examiner

MOTION POWERED PET TRACKER SYSTEM AND METHOD

CROSS REFERENCE

This application is a continuation of U.S. patent application Ser. No. 16/211,165, filed on Dec. 5, 2018, now U.S. Pat. No. 10,785,957, issued on Sep. 29, 2020, which claims priority under 35 U.S.C. § 120 and is a continuation-in-part of U.S. patent application Ser. No. 15/833,708, filed on Dec. 6, 2017, the entirety of each of which is incorporated herein by reference.

BACKGROUND

A very common problem for a pet owner is that the pet is lost or stolen. For example, the American Humane Association estimates over 10 million dogs and cats are lost or stolen in the U.S. every year. In other words, one in three pets will become lost at some point during their life.

Pet and animal movement tracker devices are well known. These known pet and animal movement tracker devices have various performance issues that limit the effectiveness of these devices. These performance issues have included battery life, water proofing, durability, weight, size, failure to update personal and pet details, loss of tags and collars, lack of GPS and/or need to implant. Further details of these known pet tracking device may be found at https://topdogtips.com/best-dog-gps-collar/ and public.homeagain.com/pdf/microchipping-whitepaper.pdf which are incorporated herein by reference. One type of known pet tracking mechanism is microchipping in which a microchip is injected under the skin of the pet. However, only 58 percent of the microchipped animals' microchips had been registered in a database with their owner's contact information so that the owner can be contacted. Many pet owners also believe, erroneously that a microchip is a tracking system that locates lost pets when in fact it does not since it merely allows a lost pet to be identified if the microchip embedded in the pet is scanned. However, all incoming pets are not scanned for a chip at veterinary hospitals or another person may find and keep the pet so that a microchip does not help at all. The microchip is a passive and reactive process in which a pet owner might get the pet returned if: 1) the pet is found and taken to a shelter; 2) the shelter scans for microchips and has an employee trained to scan for the microchips; 3) the shelter can read the signal frequency that the microchip uses since different microchips use different frequencies; 4) the chip has not failed or migrated so that it cannot be scanned; and 5) the pet owner has paid to register the chip and paid each time to update their information as it has changed over the years.

Another known pet tracking device is a pet collar that has a Global Positioning Satellite (GPS) system receiver embedded into the collar that allows a pet owner to actually track the movement of the pet. The limitation to these known GPS pet tracker collars is that due to high energy consumption the GPS portion of the collar must be recharged after draining or batteries must be replaced often, even with big bulky batteries used. This is a bother for the user and therefor often not done, but even with full batteries the battery life is very short. As a result, these known GPS pet tracker collars may be of little help if the pet is lost or stolen with a known GPS pet tracker collar having a limited or depleted energy store. Furthermore, these known GPS pet tracker collars can fall off of the pet or be taken off that renders the collars useless for tracking a location of the pet.

Thus, it is desirable to provide a motion powered pet tracker that overcomes the above limitations and technical problems with existing pet tracker devices and it is to this end that the disclosure is directed.

SUMMARY

The disclosure relates generally to the tracking of moveable objects and more particularly to the animal care industry and in particular to a system and method for tracking the movement of a pet.

A method for animal tracking is disclosed. The method may include generating, using a kinetic motion energy generator in an animal tracking device, electrical energy based on motion of an animal, storing the generated electrical energy in an energy store, receiving, by the animal tracking device, a request to track the animal, receiving, using a location tracker mechanism in the animal tracking device that is powered by the kinetic motion energy generator, location signals, and determining a location of the animal based on the location signals.

The method may also include generating the electrical energy further comprises converting a movement of the animal into electrical energy. The method may include activating an attention generating mechanism to indicate that the animal is lost.

In some embodiments, the attention generating mechanism is one of a light and a sound generator. Storing the generated electrical energy in an energy store may include storing the generated electrical energy in a rechargeable battery. Storing the generated electrical energy in an energy store may include storing the generated electrical energy in a capacitor.

The method may include attaching the animal tracker device to the animal or implanting the animal tracker device subcutaneously. Prior to receiving the request to track the animal, the location of the animal may be repeatedly determined at a first frequency and after receiving the request to track the animal, determining the location of the animal based on the location signals is at a second frequency, the second frequency being greater than the first frequency. The first frequency may be less than 4 times per hour and the second frequency is greater than 4 times per hour or greater than 10 times per hour.

A system for animal tracking is disclosed. The system may include an animal tracking device that is attached to the animal, a backend system the wirelessly communicates with the animal tracking device, and the animal tracking device may include an animal tracking mechanism that tracks a current location of the animal, a kinetic motion energy generator electrically connected to the animal tracking mechanism, the kinetic motion energy generator capable of generating electrical energy in response to a normal movement of the animal and the animal tracking mechanism having an energy store that powers the animal tracking mechanism wherein the energy store is powered by the electrical energy generated by the kinetic motion energy generator.

The animal tracking device may include a housing that houses the animal tracking mechanism, the kinetic motion energy generator and the energy store. The housing may be water resistant. The animal tracking mechanism may include a satellite based global positioning system.

The animal tracking device is attached to a harness of the animal or implanted under the skin of the animal.

An animal tracking device is disclosed. The animal tracking device may include an animal tracking mechanism that tracks a location of the animal, a kinetic motion energy generator electrically connected to the animal tracking mechanism, the kinetic motion energy generator may be capable of generating electrical energy in response to a normal movement of the animal, and the animal tracking mechanism may have an energy store that powers the animal tracking mechanism. The energy store may be powered by the electrical energy generated by the kinetic motion energy generator.

The animal tracking device may include a housing that houses the animal tracking mechanism, the kinetic motion energy generator and the energy store. The housing may be water resistant. The animal tracking mechanism may include a satellite based global positioning system.

A tracking device is disclosed. The tracking device may include a housing, an electronic tracking mechanism within the housing and configured determine a location of the device, an energy store within the housing and electrically coupled to the electronic tracking mechanism, an energy generator within the housing and electrically coupled to the electronic tracking mechanism and the energy store, the energy generator configured to supply power to the electronic tracking mechanism and the energy store, a communications module, and a controller configured to receive a request to determine the location of the device via the communications module, instruct the electronic tracking mechanism to receive wireless location data, determine the location of the device, and transmit the location of the device via the communications module.

The controller may be configured to wake the electronic tracking mechanism from a low power mode to a high power mode when the request is received. In the high power mode a frequency of the location determination and a frequency of the transition of the location of the device provides that the net power usage, including power generated by the electronic tracking mechanism and the power consumed by the communications module, controller, and electronic tracking mechanism is less than 10% of the energy store capacity in 10 minutes.

The energy generator may be a kinetic motion energy generator electrically connected to the electronic tracking mechanism. The kinetic motion energy generator may be configured to generate electrical energy in response to a normal movement of the device.

The controller may be configured to switch between a high energy usage mode and a low energy usage mode. A frequency and a duration of operation of the communication device or the location tracking mechanism may be varied between the high energy usage mode and the low energy usage mode.

The frequency and the duration of the operation of the communication device or the location tracking transceiver are varied based on sensor data. The sensor data may include one or more of energy generation level, battery voltage level, movement sensor, or based on location or tracking data. The duration of the operation of the communication device or the location tracking transceiver may be lower in the low energy usage mode than the high energy usage mode. The frequency of the operation of the communication device or the location tracking transceiver is lower in the low energy usage mode than the high energy usage mode.

The housing may be attached to an object for tracking the object.

A tracking system is disclosed. The tracking system may include a backend system configured to receive an request to track an object and to wirelessly transmit the request and a tracking device including a housing, an electronic tracking mechanism within the housing and configured determine a location of the device, an energy store within the housing and electrically coupled to the electronic tracking mechanism, an energy generator within the housing and electrically coupled to the electronic tracking mechanism and the energy store, the energy generator configured to supply power to the electronic tracking mechanism and the energy store, a communications module, and a controller configured to receive, from the backend system, the request to determine the location of the device via the communications module, instruct the electronic tracking mechanism to receive wireless location data, determine the location of the device, and transmit the location of the device via the communications module.

The backend system may be configured to receive the request to track the device from a user device, receive the determined location of the device from the tracking device, and transmit the determined location to the user device. The tracking device, the backend system, and the user device may all be remote from each other.

The controller may be configured to wake the electronic tracking mechanism from a low power mode to a high power mode when the request is received, wherein, in high power mode a frequency of the location determination and a frequency of the transition of the location of the device provides that the net power usage, including power generated by the electronic tracking mechanism and the power consumed by the communications module, controller, and electronic tracking mechanism is less than 10% of the energy store capacity in 10 minutes to provide tracking for locating a lost animal or object. The energy generator may be a kinetic motion energy generator electrically connected to the electronic tracking mechanism, the kinetic motion energy generator configured to generate electrical energy in response to a normal movement of the device.

The controller may be configured to switch between a high energy usage mode and a low energy usage mode. A frequency and a duration of operation of the communication device or the location tracking mechanism may be varied to between the high energy usage mode and the low energy usage mode. The frequency and the duration of the operation of the communication device or the location tracking transceiver are varied based on sensor data. The sensor data may include one or more of energy generation level, battery voltage level, movement sensor, or based on location or tracking data. The duration of the operation of the communication device or the location tracking transceiver may be lower in the low energy usage mode than the high energy usage mode. The frequency of the operation of the communication device or the location tracking transceiver may be lower in the low energy usage mode than the high energy usage mode. The housing may be attached to an object for tracking the object.

A method for tracking an object is disclosed. The method may include generating, using an energy generator in a device, storing the generated electrical energy in an energy store, receiving, by the tracking device, a request to track the object, receiving, using a location tracker mechanism in the tracking device that is powered by the energy generator, location signals, and determining a location of the object based on the location signals.

Generating the electrical energy may include converting a movement of the object into electrical energy. The method may include activating an attention generating mechanism to indicate that the object is lost.

Storing the generated electrical energy in an energy store may include storing the generated electrical energy in a rechargeable battery. Storing the generated electrical energy in an energy store may include storing the generated electrical energy in a capacitor.

The method may include attaching the tracker device to the object.

Prior to receiving the request to track the object, the location of the animal may be repeatedly determined at a first frequency and after receiving the request to track the animal, determining the location of the animal based on the location signals may be at a second frequency, the second frequency being greater than the first frequency. The first frequency may be less than 4 times per hour and the second frequency may be greater than 10 times per hour. The energy generator may be one or more of a kinetic motion energy generator, a solar powered generator, a thermo electric generator, or a wireless energy harvester. The energy generator may be an electro mechanical, piezo electric, or magneto electric kinetic motion energy generator.

A tracking device is disclosed. The tracking device may include a tracking mechanism configured to track a location of an object, a kinetic motion energy generator electrically connected to the tracking mechanism, the kinetic motion energy generator configured to generate electrical energy in response to movement of the object, an energy store electrically coupled to the tracking mechanism and the kinetic motion energy generator configured to power the tracking mechanism and to receive the electrical energy generated by the kinetic motion energy generator, and a communication device configured to transmit the location of the object.

The controller is configured to switch between a high energy usage mode and a low energy usage mode. In the low energy usage mode a frequency and/or duration of the communication device and/or the location tracking mechanism are further configured to provide that the net energy usage of the tracking device may be lower than or equal to the energy generated by the kinetic motion generator over a period of time. In the high energy usage mode a frequency and/or a duration of the communication device and/or the location tracking mechanism are further configured to provide a more frequent and/or longer duration of communication and/or location determination than in the lower energy usage mode.

A frequency and/or a duration of operation of the communication device and/or the location tracking mechanism may be varied between the high energy usage mode and the low energy usage mode. A frequency and/or a duration of the operation of the communication device and/or the location tracking transceiver are varied based on sensor data. Sensor data may include one or more of energy generation level, output signals of kinetic motion energy generator, battery voltage level, movement sensor, or based on location or tracking data.

The frequency and/or a duration of the communication device and/or the location tracking mechanism are further configured to increase and/or decrease in frequency and/or duration when more or less movement is detected. The movement may be detected based on battery level and/or output signals from the Kinetic energy harvester and/or location data from the location tracking mechanism.

The duration and/or frequency of the operation of the communication device and/or the location tracking transceiver may be lower in the low energy usage mode than in the high energy usage mode. The frequency and/or duration of the operation of the communication device and/or the location tracking transceiver may be lower in the low energy usage mode than the high energy usage mode. A frequency and/or a duration of operation of the communication device and/or the location tracking mechanism may be set based on an output signal and/or energy generation of the kinetic motion energy generator and/or the energy level in the energy storage and/or the movement based data of the tracking mechanism and/or other sensor data and/or a signal received by the device.

The frequency and/or a duration of the communication device and/or the location tracking mechanism are further configured to increase and/or decrease in frequency and/or duration when more or less movement is detected, the movement being determined based on battery level change and/or output signals from the Kinetic energy harvester and/or location data from the location tracking mechanism.

The frequency and/or the duration of the communication device and/or the location tracking mechanism may be configured to increase and/or decrease when a signal is received by the tracking device.

The methods, systems or apparatus may include the controller being configured to switch between a high energy usage mode and a low energy usage mode. In the low energy usage mode a frequency and/or duration of the communication device and/or the location tracking mechanism may be further configured to provide that the net energy usage of the tracking device is lower than or equal to the energy generated by the kinetic motion generator over a period of time. The high energy usage mode a frequency and/or a duration of the communication device and/or the location tracking mechanism are further configured to provide a more frequent and/or longer duration of communication and/or location determination than in the lower energy usage mode.

The methods, systems or apparatus may include a frequency and/or a duration of operation of the communication device and/or the location tracking mechanism may be varied between the high energy usage mode and the low energy usage mode. A frequency and/or a duration of the operation of the communication device and/or the location tracking transceiver may be varied based on sensor data. The sensor data may include one or more of energy generation level, output signals of kinetic motion energy generator, battery voltage level, movement sensor, or based on location or tracking data. The frequency and/or a duration of the communication device and/or the location tracking mechanism are further configured to increase and/or decrease in frequency and/or duration when more or less movement is detected. The movement may be detected based on battery level and/or output signals from the Kinetic energy harvester and/or location data from the location tracking mechanism.

The methods, systems or apparatus may include the duration and/or frequency of the operation of the communication device and/or the location tracking transceiver being lower in the low energy usage mode than in the high energy usage mode. The frequency of the operation of the communication device or the location tracking transceiver may be lower in the low energy usage mode than the high energy usage mode. A frequency and/or a duration of operation of the communication device and/or the location tracking mechanism may be set based on an output signal and/or energy generation of the kinetic motion energy generator and/or the energy level in the energy storage and/or the movement based data of the tracking mechanism and/or other sensor data and/or a signal received by the device. The frequency and/or the duration of the communication device and/or the location tracking mechanism may be configured to increase and/or decrease in frequency and/or duration when more or less movement is detected, the movement being determined based on battery level change and/or output signals from the Kinetic energy harvester and/or location data from the location tracking mechanism. The frequency and/or a duration of the communication device and/or the location tracking mechanism are further configured to increase and/or decrease when a signal is received by the tracking device.

DETAILED DESCRIPTION OF THE INVENTION

The disclosure is particularly applicable to a tracking device, system and method that is architected as described below and it is in this context that the disclosure will be described. It will be appreciated, however, that the device, system and method has greater utility, such as to motion powered animal tracker device, system and method architected in other manners and using other mechanisms that are within the scope of the disclosure. The motion powered tracking device may be used to track moving objects, such as vehicles, animals and in particular, land mammals, such as humans, dogs, cats, etc.

Figure 1:
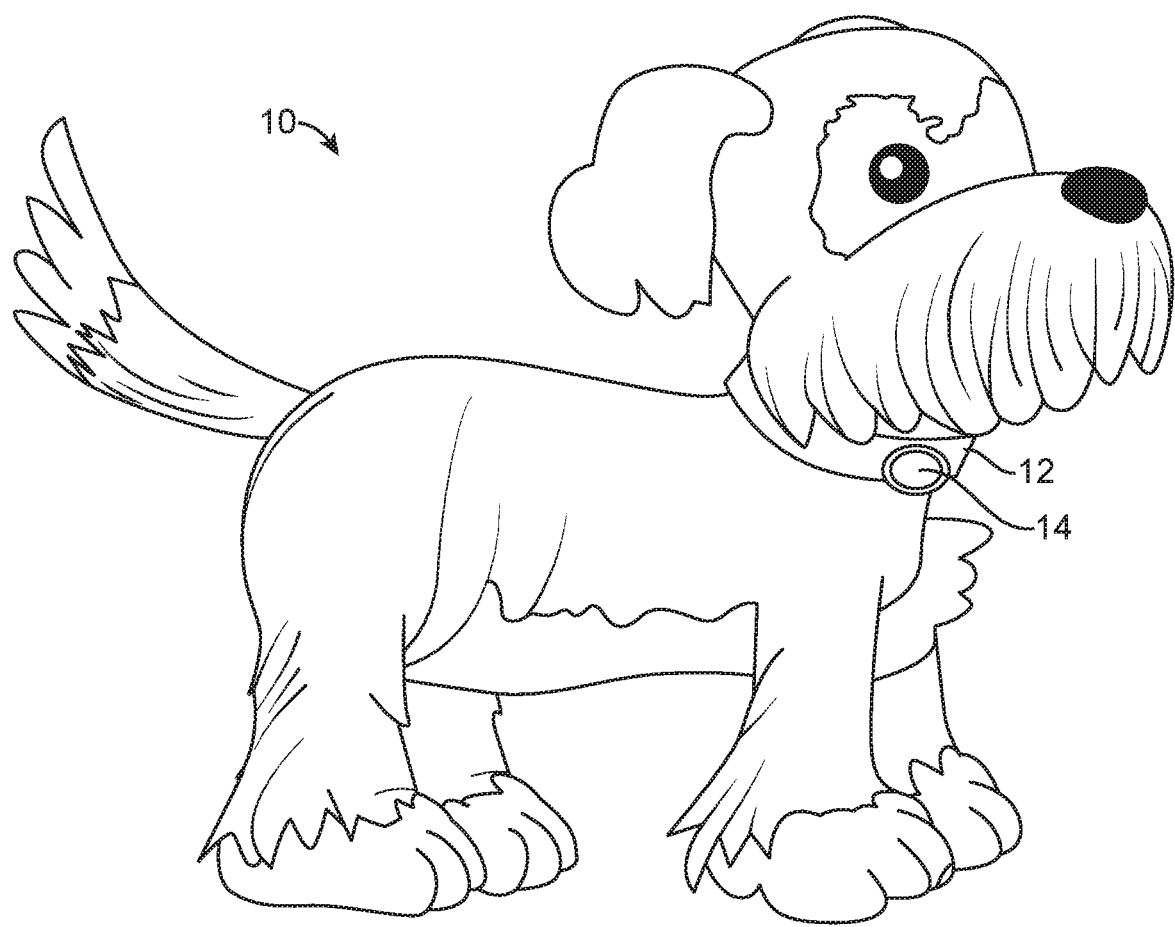
FIG. 1 is an animal with a motion powered tracking device.

FIG. 1 depicts an animal 10 with a motion powered tracking device 14. In the example embodiment shown in FIG. 1, the motion powered tracking device 14 may be attached to or integrated into something that is wearable by the animal 10, such as a collar 12. In an alternative embodiment, the motion powered tracking device 14 may be implantable or placed under the skin of the animal 10. Thus, the motion powered tracking device 14 may be wearable by the animal or subcutaneous or otherwise implanted within or under the skin of an animal. Both wearable and implanted, the motion powered tracker device 14 includes a mechanism to determine the location and track movement of the animal and a mechanism that generates electrical energy based on the regular movement of the animal, such as the normal activity of the pet or other animal. The motion powered tracker device 14 provides a technical solution to the above problem by combining a piece of technology of a tracking device, a piece of technology of a motion based energy generator and electronics configured to balance the tracking and energy generation functionality of those technologies so that the disclosed motion powered tracker device maintains sufficient electrical energy generation and storage such that it does not run out of battery power or fails to determine the location of the animal at a critical time. It is understood that embodiments of the motion powered tracker device 14 may have different sizes and shapes.

Figure 2:
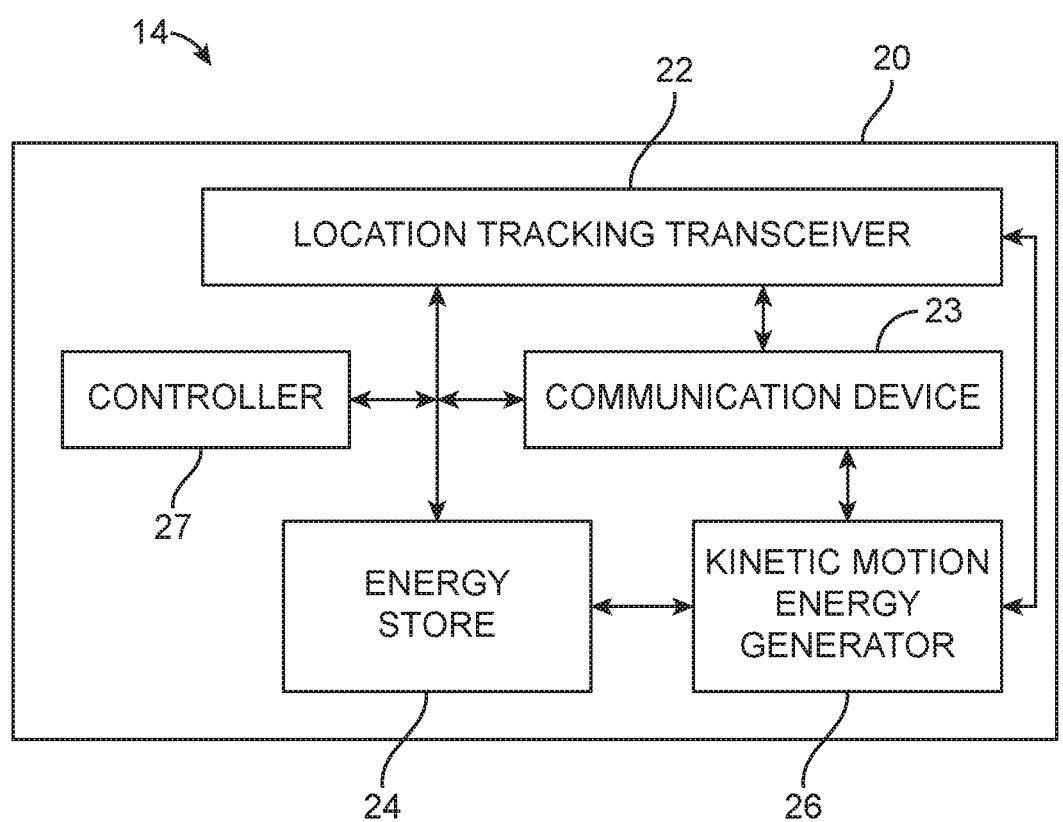
FIG. 2 illustrates a system diagram of the motion powered tracking device of FIG. 1.
Figure 3:
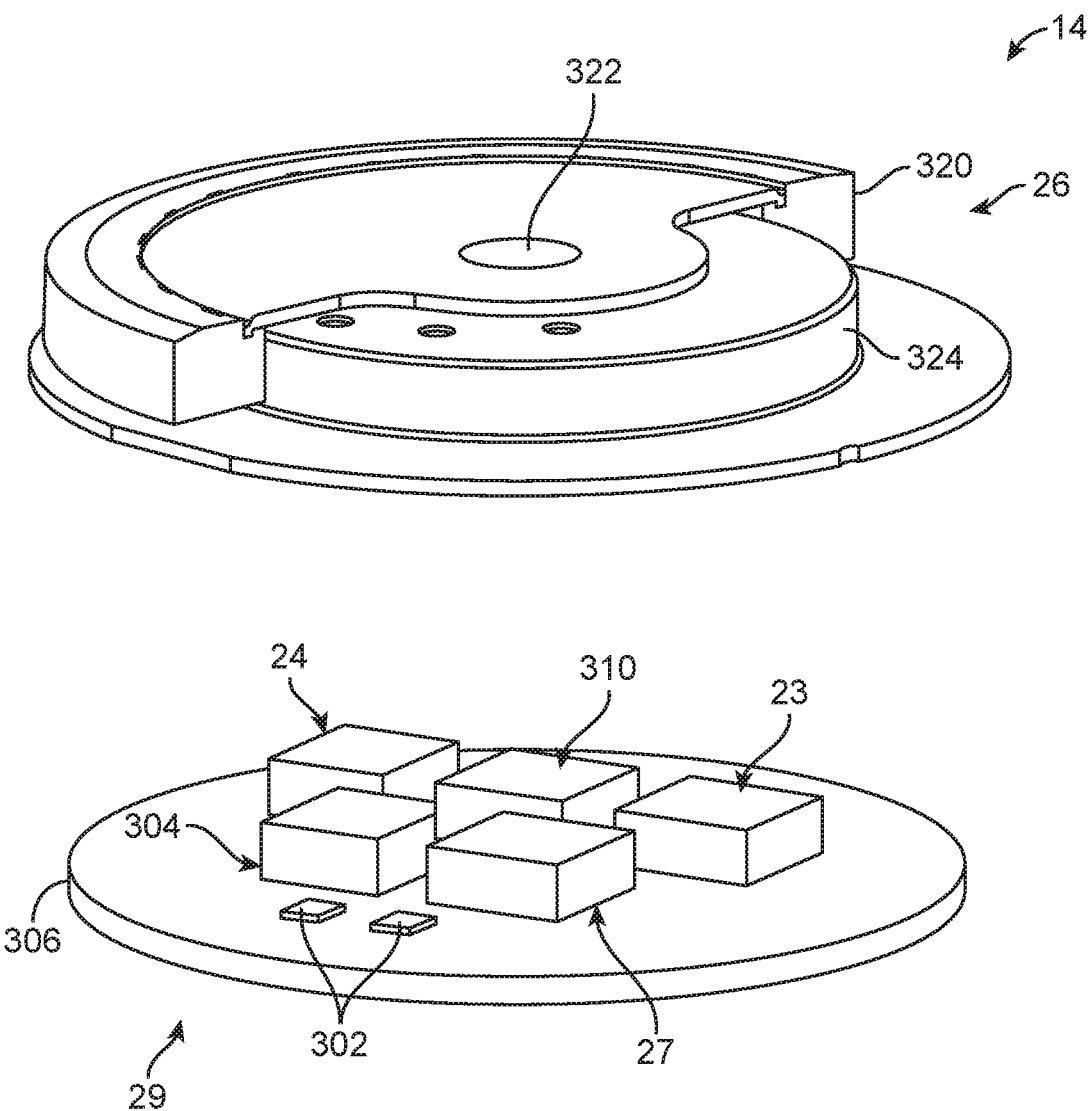
FIG. 3 illustrates details of the motion powered tracking device of FIG. 1.

FIGS. 2 and 3 illustrate additional details of the motion powered tracking device 14. The device 14 may have a housing 20 that houses a location tracking mechanism, such as a location tracking transceiver 22. The location tracking transceiver 22 may be a satellite based positioning system based integrated circuit or a plurality of circuits that make up the tracking transceiver 22. The tracking transceiver may be a wireless position transceiver or receiver. For example, a Bluetooth or Internet-of-Things based geolocation transceiver, or the satellite based positioning system may be the known GPS system, the Russian based GLONASS system, the European Union based Galileo positioning system, the Chinese BeiDou Navigation Satellite System, India's Indian Regional Navigation Satellite System, and Japan's https://en.wikipedia.org/wiki/Quasi-Zenith Satellite System. As is well known, the location tracking transceiver 22 may receive signals from a plurality of satellites and then determine, using correlation and other known processes based on the satellite signals, the location of the animal to which the motion powered tracker device is attached.

Figure 6:
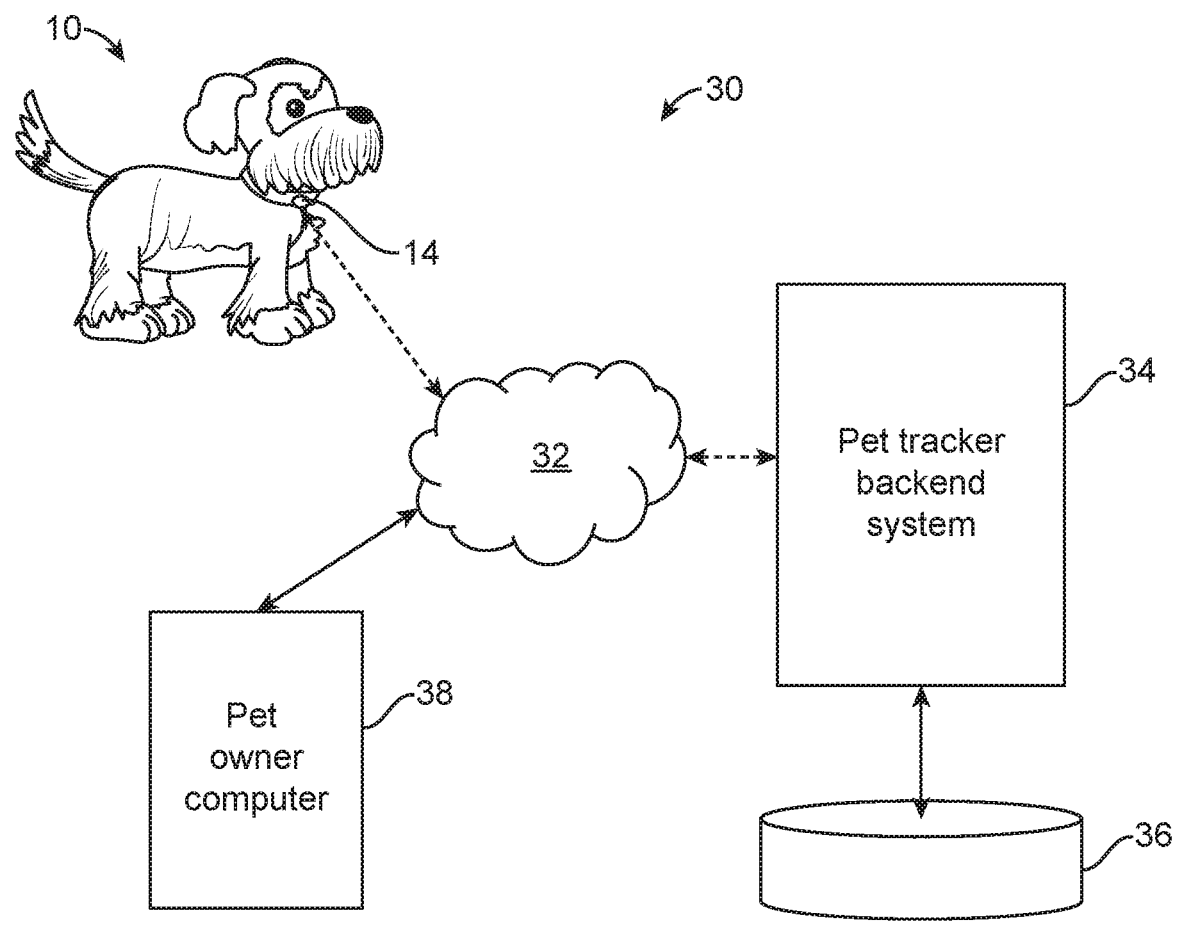
FIG. 6 illustrates a tracking system that utilizes the motion powered tracking device.

The device 14 may also include a communication device 23 that is coupled to the location tracking transceiver 22. The communication device 23 may process the location data generated by the location tracking transceiver 22 and may wirelessly communicate that location data to a tracking system as shown in FIG. 6 and described below. The communication device 23 may be electrically coupled to the location tracking transceiver 22. The communication device may be in coupled in electronic communication with the location tracking transceiver 22 such that the communication device 22 receives location information from the location tracing transceiver 22. In some embodiments, the components, such as the location tracking transceiver 22, the communication device 23, the energy store 24, and the kinetic motion energy generator 26, and the controller 27 can be separate components or integrated into one or more separate components.

In some embodiments, the location tracking transceiver may be directly coupled to the communication device while in other embodiments the location tracking transceiver may be indirectly coupled to the communication devices, such as via a processor which receives the location information and process and prepares the information for transition by the communication device.

The device 14 may also include an energy store 24 that may be coupled to both the location tracking transceiver 22 and the communication device 23 to provide energy to the location tracking transceiver 22 and the communication device 23. For example, the energy store 24 may be a rechargeable battery, or a combination of storage devices, such as a rechargeable battery or capacitor and a disposable battery, or other rechargeable or non rechargeable energy store. Alternatively, the energy store may be an energy storage device, such as a capacitor and the like. The device 14 may further comprise an energy generator 26 that is electrically connected to the energy store 26. In some embodiments, the energy generator 26 is a kinetic motion energy generator. The kinetic motion energy generator may be electromechanical, piezo electric, or magneto electric, as described herein. In some embodiments, the energy generator 26 may be expanded with solar powered generator that converts solar energy to electrical energy or a wireless energy harvester that converts electromagnetic energy transmitted through, for example, radio waves, to electrical energy. In some embodiments, the energy generator 26 may be an thermo electric generator. The energy generator 26 is directly electrically connected to the location tracking transceiver 22 and the communication device 23 directly, such as when the kinetic motion energy generator 26 is used without an energy store 24. In some embodiments, the controller 27, location tracking transceiver 22 and the communication device 23 are directly electrically coupled to the kinetic motion energy generator 26 and the energy store.

The kinetic motion energy generator 26, converts movement of the pet or other animal into electrical energy and provides the electrical energy that may be used to power the elements of the device 14. In some embodiments, the device 14 may have a combined energy store and energy generator that stores energy, provides energy to the elements of the system, and generates energy based on the motion of the animal. For example, the kinetic motion energy generator 26 may be a micro generator mechanism made by Kinetron (details of which may be found at www.kinetron.eu/micro-generator-technology/that is incorporated herein by reference.)

The kinetic motion energy generator uses moveable eccentric weight 320 which moves when the position of the system changes in relation to the direction of gravity or as induced by the forces imparted to the device through the movement of the pet or animal to which it is attached. The moveable eccentric weight is attached via a shaft 322 to a set of accelerating gears and micro mechanical parts with in turn are coupled to a magnetic rotor of an electro magnetic generator which are all part of the gearbox and rotor assembly 324. A mechanical spring system may also be included as part of the gearbox and rotor assembly 324. The mechanical spring accelerates the rotor of the electromagnetic generator. The mechanical spring stores the energy of the eccentric weight when the device is moved until the torque in the spring has reached a threshold level. When the spring energy reaches the threshold level, the spring energy is released, which causes acceleration of the magnetic rotor and electrical energy generation within the windings of the generator.

The electrical energy generated within the windings of the generator is alternating and the direction and frequency of the energy may be based on the direction and speed of movement of the rotor. The windings are electrically coupled to electric contacts 302 on the substrate 306 of the electrical component assembly 29. The power travels from the contacts 302 to the various components of the electrical component assembly 29.

In some embodiments, the device 14 may include a manual driven crank, disk or knob operated generator. The crank, disk or knob driven generator may be in place of or in addition to the kinetic motion energy generator 16 and may be coupled either directly or indirectly to the controller 27, the communication device 23, and the location tracking transceiver 22. A hand crank, disk, knob operated generator, sometimes referred to as a wind-up generator or charger includes a crank, disk or knob, which may be a lever or other mechanical structure that is grasped by an operator's hand. The lever or other mechanical structure is connected to a shaft that is then coupled either directly or through a gear box to the armature of a generator. When the handle or lever is rotated about the shaft, kinetic energy from is transferred to the shaft which may then be transferred to the gear box and then to the armature where rotation of the armature within a magnetic field created by the stator of the generator, generates electrical energy to power the device and/or charge the energy store within the device.

The device 14 may also include an induction charging system, sometimes referred to as a wireless charging system. In an induction charging system, an induction coil in the device 14 is placed within an alternating electromagnetic field of a charging based. The alternating electrical magnetic field of the charging base induces an electrical current within the coil, which is then used to power the device and/or charge the energy store within the device.

The device 14 may further include one or more mechanisms, such as lights, a sound generator, an Amber alert type signal, etc., that may be activated by a signal from the system or device when the animal is considered to be lost so that people who see the animal will have their attention drawn to the animal. The exterior of the device may also include a phosphorescent material or phosphorescent coating that illuminates the device in the dark, a so-called glow-in-the-dark feature. The device 14 and its housing 20 may be sealed and waterproof, water resistant, or waterproof, when it is wearable. The device 14 or its enclosure may be made from a bio-compatible material when the device 14 is subcutaneous. The device 14 or the backend in FIG. 6 may also send notifications when an animal is outside of a designated area.

The device 14 may further include a controller 27. The controller 27 may be an integrated circuit or processor that is configured to control the distribution of power from the generator 26 to the various components of the electrical component assembly 29. The controller 27 also controls the operation of the components of the electrical component assembly 29. In some embodiments, the tracking module, the location tracking transceiver, the communication device, and the controller may be integrated into a single module. The single module may implement the functions and circuitry for determining the device's location, communicating the location, and managing the energy generation and consumption of the device 14. In particular, the controller 27 may control the components to efficiently manage the overall power consumption of the device 14. To minimize energy consumption the controller may be programmed to connect or disconnect, or activate or de-activate, certain components, such as the communication device and location tracking transceiver. As discussed elsewhere herein, constant operation of the location tracking transceiver or the communication device leads to rapid depletion of the energy stored within the energy store 24. In order to manage the electrical power consumption of the device 14 while providing a positive user experience, the controller 27 balances tracking availability with energy consumption, as described herein.

As shown in FIG. 3, the device 14 includes a power module 304. The power module 304 may include the power store 24 along with other power components, such as a rectifying circuit, such as an AC to DC converter circuit that converts the alternating energy from the generator 26 into DC energy for delivering energy to the energy store to, for example, charge a rechargeable battery or capacitor within the energy store.

The device 14 may also include a sensor module 310. The sensor module may include the various sensors for tracking the position of the device and other environmental and system data. For example, the sensor module 310 may include or be coupled to a thermometer for recording temperature, a volt meters and amp meters for measuring the state of charge of the battery, power consumption of the device of any one of its modules or components, and power generation by the generator 26. The sensor module 310 may also include or be coupled to accelerometers or gyroscopes to measure movement of the device 14.

As discussed above, the controller is powered by the energy from the battery and the electronic circuit and/or is programmed to manage the energy and functions of the device and the component and modules of the electrical component assembly 29.

The device 14 and each of the electrical components and modules may operate in both a low energy mode, that consumes relatively low energy, and a high energy mode that consumes relative high energy, or more energy than in the low energy mode. The high energy mode is associated with active use of the device, module, or component. For example, in high energy mode the GPS is actively receiving signals from orbiting satellites and/or computing the device's location based on those signals and sending the signals or computed location to the communication device 23 for transmission. In high energy mode the controller 27 may activate the GPS module continuously, to determine, store and/or communicate the location of the tracker. In some embodiments, in high energy mode the controller 27 may activate the GPS module for continuous operation and compute and report position data for example every 5 seconds, 10 seconds, 30 seconds, or 1 minute.

In low energy mode the GPS or location tracking transceiver may be in a sleep mode, wherein it is not actively processing satellite signals or communicating with the communication device. In some embodiments in low energy mode the controller 27 may activate the GPS module periodically and with a certain duration, to determine, store and/or communicate the location of the tracker. For example, a period of 5 or 10 minutes for a duration of 10 seconds, 30 seconds, or 1 minute.

In low energy mode the controller activates the telecommunication module infrequently for a short duration to send and/or receive messages about the status and/or location of the tracker. For example, the telecommunication module may be activated, connect to the network, such as a cellular network, and then connect to backend system (described below) to send or receive updates, before going back to sleep or standby.

In high energy mode the controller activates the telecommunication module more often and/or for longer periods, to send and/or receive messages about the status and/or location of the tracker. Also the electronic circuit and/or the IC activates the GPS module more frequently to determine, store and/or communicate the location of the tracker in a faster and/or more accurate way.

In some embodiment, the device may operate in a lower power mode prior to receiving a request to track the object. Before the request is received, the location of the animal or object may be repeatedly determined at a first frequency, for example, less than four times per hour. After receiving the request to track the animal or object, the device may switch to a high power usage mode wherein the location of the animal is determined based on the location signals at a second frequency, the second frequency being greater than the first frequency. For example the second frequency may be greater than 4 times per hour or less than 10 times per hour, such as during especially low energy generation periods.

In the low energy usage mode a frequency and/or duration of the communication device and/or the location tracking mechanism are further configured to provide that the net energy usage of the tracking device may be lower than or equal to the energy generated by the energy generator over a period of time. For example, the device may measure the voltage change of the energy store over a period of time or measure the energy generated by the energy generate and the energy used by the components of the device, such as the communication module, the location transceiver, and the controller to determine whether the device is consuming more energy of a period of time, such as 5 minutes. If the device is consuming more energy than it is generating, the controller may reduce the frequency or duration, or both, of operation of the communication module or the location module (or the sensor module) or both.

In the high energy usage mode a frequency and/or a duration of the communication device and/or the location tracking mechanism are further configured to provide a more frequent and/or longer duration of communication and/or location determination than in the lower energy usage mode. In the high energy usage mode, the net energy usage or voltage change of the energy store over a period of time my be measured, for example, as described herein, so that the net energy usage depletes the energy stored in the energy store at a rate of greater than 10% per hour.

A frequency and/or a duration of the operation of the communication device and/or the location tracking transceiver may be varied based on sensor data. The sensor data may include one or more of energy generation level, output signals of kinetic motion energy generator, battery voltage level, movement sensor, or based on location or tracking data. When the sensor data indicates excess energy generation, for example, when net energy generation is positive or the battery sensor indicates an increase in stored energy over a period of time, the frequency and/or a duration of the operation may be increased.

The frequency and/or a duration of the communication device and/or the location tracking mechanism are further configured to increase and/or decrease in frequency and/or duration when more or less movement is detected. The movement may be detected based on an increase in batter level or a reduction in the rate at which the battery energy is being consumed, for example by measuring these properties and regular intervals and comparing a current measurement with a previous measurement. Movement may also be determined based on output signals from the Kinetic energy harvester and/or location data from the location tracking mechanism. For example, when a measurement of location at some time is greater than a predetermined threshold distance from the previous measurement or the calculated velocity based on measurement data is greater than a threshold.

The frequency and/or the duration of operation of the communication device and/or the location tracking mechanism may be set based on an output signal and/or energy generation of the kinetic motion energy generator and/or the energy level in the energy storage and/or the movement based data of the tracking mechanism and/or other sensor data and/or a signal received by the device, based on measurements as described herein.

The frequency and/or a duration of the communication device and/or the location tracking mechanism are further configured to increase and/or decrease in frequency and/or duration when more or less movement is detected, the movement being determined based on battery level change and/or output signals from the Kinetic energy harvester and/or location data from the location tracking mechanism. For example, when measured values are above a threshold that indicates greater power generation, the frequency or duration may be increased and if less than a threshold, then the frequency or duration may be decreased.

The controller 27 is programmed to optimize functionality and minimize energy consumption, both in low and high energy mode. One way this is achieved is by operating at different settings for the frequency and duration of use for the telecommunication and/or GPS module to achieve a low and high energy mode. These settings may be based on the amount of energy generated by the tracking device, the amount of energy remaining in the battery, the movement speed of the tracking device, and the location requests received or location tracking mode of the device.

The low or high energy mode can be remotely switched on by sending a signal to the electronic circuit of the tracker, i.e. switch to high energy mode when a quick and accurate location of the tracker is needed (emergencies).

The controller can also switch between high and low energy mode based on preprogrammed times, events, algorithms, information from the sensor module, such as movement based information (energy generation, voltage levels, frequencies, etc.) from the energy harvester, information from a movement sensor, information from a temperature sensor, information from the battery level, position information from the GPS module or external information received by the telecommunication module.

The controller also updates or switches between different frequency and/or duration settings for the communication and/or GPS module and/or any other electronic component on the electronic circuit, based on preprogrammed times, events, algorithms, information from the sensor module, such as movement based information from the energy harvester, information from a movement sensor, information from a temperature sensor, information from the battery level, position information from the GPS module or external information received by the telecommunication module.

Figure 4:
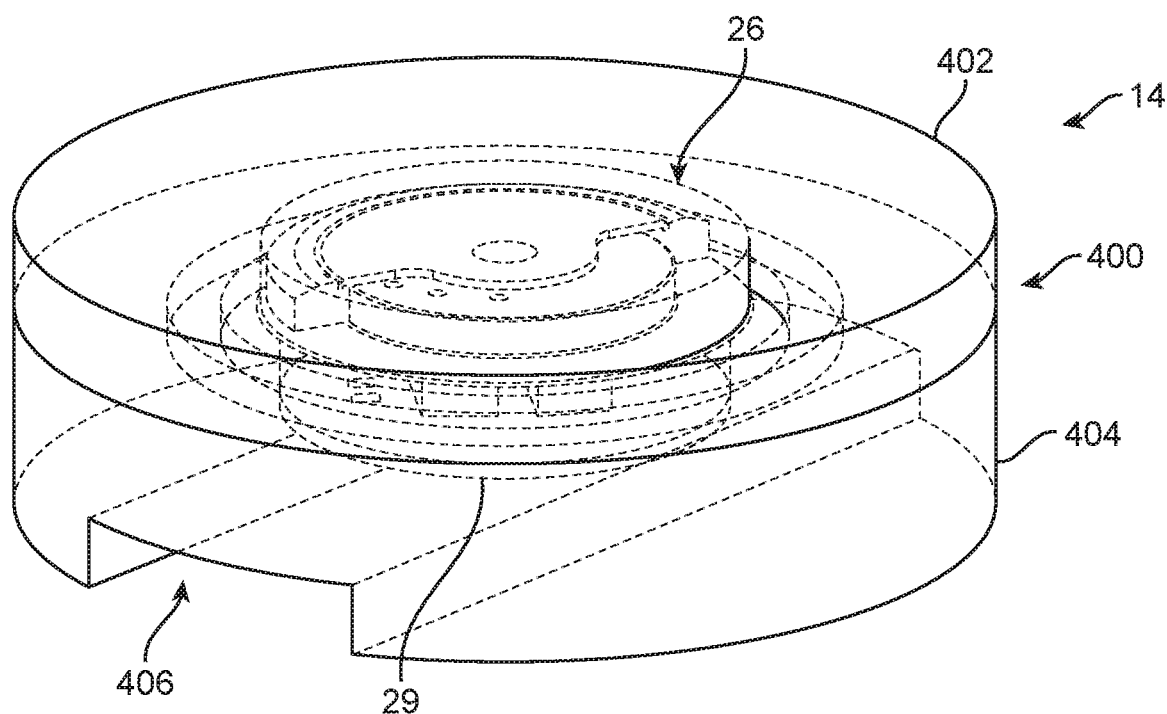
FIG. 4 illustrates the motion powered tracking device of FIG. 1 in a housing.

FIG. 4 depicts the device 14 including the energy generator 26 and electrical component assembly 29 in a stacked configuration within a housing 400. The housing 400 may be a multi-part housing, such as a two-part housing as shown in FIG. 4. The housing 400 includes a base 404 and a cover 402. The stacked energy generator 26 and electrical component assembly 29 are retained within a cavity in the device 14 formed within and between the base 404 and cover 402. The base may also include a coupling 406 that couples or otherwise attached the device 14 to the animal. For example, the coupling 406 may engage with a harness, such as a collar, either directly or indirectly, so as to attach the device 14 to an animal or other object being tracked.

Figure 5:
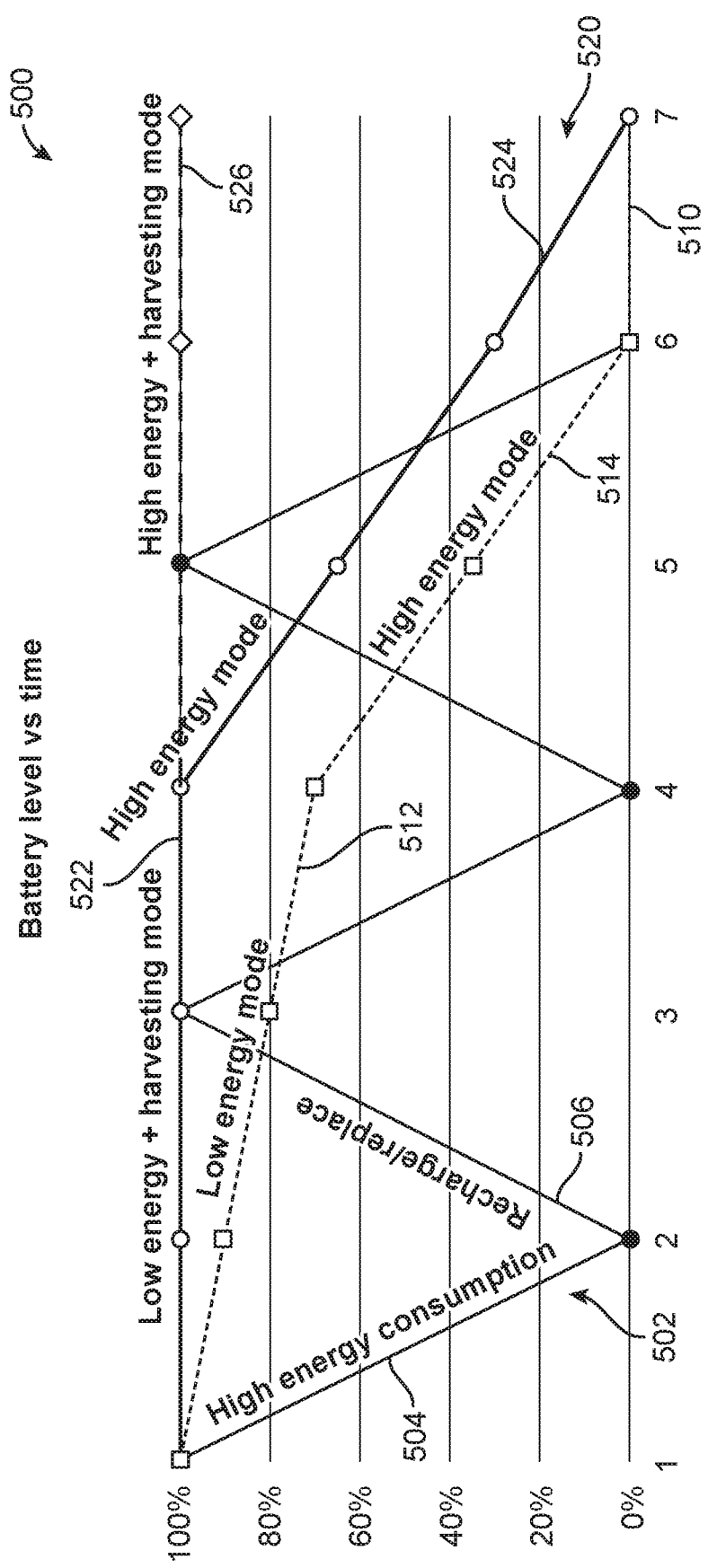
FIG. 5 illustrates energy profiles of tracking devices, including the motion powered tracking device of FIG. 1.

FIG. 5 shows the difference in energy usage between the embodiments of the device 14 disclosed herein and other devices, such as a high energy consumption rechargeable device. Battery change and discharge line 502 shows the high discharge rate 504 of such devices and the external recharge or replace cycle 506 employed by such devices. During use, such devices regularly run out of power, however the device 14 and the energy usage control implemented by the controller 27 can greatly extend the discharge time, as shown in discharge line 510, which depicts the energy usage in low energy mode 512 and high energy mode 514. With the addition of an energy generator, such as the kinetic energy generator and control discussed herein, the device may generate, store, and use energy such that the device may be powered indefinitely. For example, in the low energy usage mode combined with kinetic energy harvesting provided by the kinetic energy generator, the device may maintain substantially full charge, as depicted by the low energy line 522. In some embodiments, particularly during high kinetic energy generation, the device may maintain substantially full charge even during high energy mode, as depicted by high energy discharge line 526.

FIG. 6 illustrates a tracking system 30 that utilizes the motion powered tracking device 14. The system may include one or more animals 10 with a motion powered tracker device 14, each of which wirelessly communicates over a communication path 32 to a tracker backend system 34. The communication path 32 may be one or more of a wired or wireless communication path, such as a WiFi network, a cellular network, a digital data network and the like. In operation, the tracker device 14 may receive signals as described above and generate location data from the particular animal (or the location data may be generated by the tracking backend 34 when the device 14 communicates the satellite data to the backend) and communicate that location data of the animal over the communication path 32 to the backend 34. Alternatively, the tracking device may have mark, such as a bar code or an electronic signature that may be scanned by a user to identify the animal or download the animal location information to the backend 34.

The backend 34 may be implemented using one or more computing resources, such as one or more server computers, one or more cloud computing resources, computing resources from Amazon web services/systems (AWS) and the like. In some embodiments, the tracker device 14 may communicate directly with an animal owner computer 38 to allow the animal owner to track the animal 10. The animal owner computer 38 may be a processing unit device with a processor, memory, a display and connectivity circuits that can connect to and interact with the backend 34. For example, the animal owner computer 38 may be a personal computer, a tablet computer, a laptop computer, a smartphone device, such as an Apple iPhone or Android operating system based device, a cellular phone or a terminal.

The backend system 34 may provide various tracking services based on the location data for each animal. For example, the backend system 34 may generate and provide a user interface to an animal owner computer 38 connected to the backend 34 over the communication path 32. For example, the backend 34 may provide animal location data to the animal owner. The backend system 34 may further provide other services to the animal owner. For example, the backend system 34 may have a mobile application (that may be downloaded by each animal owner) that may be used by animal owner to direct or lead the animal owner to their animal based on the location signals.

Figure 7:
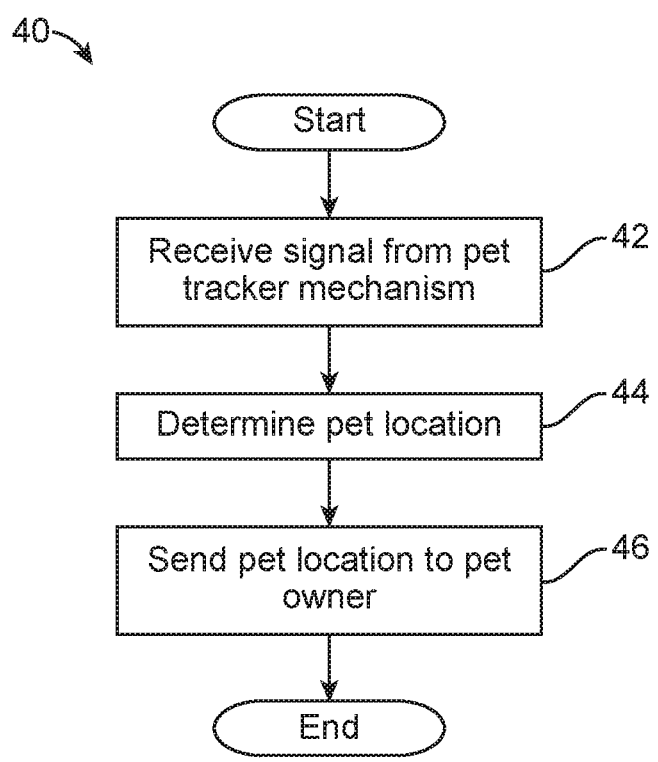
FIG. 7 illustrates a method for determining an animal location and movement.

FIG. 7 illustrates a method 40 for determining an animal location/movement. In the method, a signal may be received from the tracker mechanism 42 and the animal location is determined 44. In some embodiments, the device 14 shown in FIGS. 2-3 may receive signals from a plurality of location satellites and may generate a location of the animal using the well-known techniques described above. In other embodiment, the device 14 may receive signals from a plurality of location satellites, communicate those signals from the plurality of location satellites to the backend system and the backend system may correlate the signals of the plurality of location satellites to generate the animal location. The method may then send the location to the owner 46. In an alternative method, the tracker device 14 may send its location data directly to the owner.

In some embodiments, the device may include a switch, such as a button that can be pushed, flipped or otherwise toggled to activate the device. In such embodiments, toggling the switch or button activates the device and aids in locating the animal and alerting the animal owner of the animal's location. For example, when someone comes upon an animal with the device 14, they may push the push-to-activate button. If the device is in a low energy mode, such as a sleep mode, the device wakes from the low power sleep mode into an active mode. The location tracking transceiver then begins receiving location signals, for example, from orbiting satellites. After the device receives a sufficient amount of location signals to determine the location of the animal, the communication device is activated. The communication device may then either transmit the location signals or the location of the device 14 to the backend system 34 along with a message that indicates that the animal's push-to-activate button was activated. The backend system may then send a message to the animal owner's device, such as their cell phone to alert the animal owner that their animal was found.

In some embodiments, the device may include a tamper sensor as part of or separate from the sensor module that activates the tracking device when the tracker is removed or attempted to be removed from the object or animal to which it is attached.

In some embodiments, an animal owner may notice their animal is missing. They may then activate the device 14 in order to receive location information and retrieve their animal. In such an embodiment, the animal owner may send a message to the device 14 through the backend system. The device, which may be in a low power mode, having only its communication device active or intermittently active, then receives the signal. After the signal is received, lights or other sound emitting devices on the device 14 may be activated to alert people nearby of the presence of a lost animal, as described above. The location tracking transceiver is then activated and begins receiving location signals, for example, from orbiting satellites or based on nearby cellphone tower data. After the device receives a sufficient amount of location signals to determine the location of the animal, the location information may be send to the communication device. The communication device may then either transmit the location signals or the location of the device 14 to the backend system 34. The backend system may then send a message though the backend system to the animal owner's device, such as their cell phone to alert the animal owner of the animal's location. The location information may be periodically updated at a preset time interval, until the animal is found.

In some embodiments, the device 14 may continuously track the animal's location. For example, the device may sleep in a low power mode and then wake at preset intervals, such as every 5 minutes, 10 minutes, 15 minutes, etc. During the wake period the device wakes from the low power sleep mode into an active mode. The location tracking transceiver then begins receiving location signals, for example, from orbiting satellites or nearby cell towers. After the device receives a sufficient amount of location signals to determine the location of the animal, the communication device is activated. The communication device may then either transmit the location signals or the location of the device 14 to the backend system 34. The backend system may then send a message to the animal owner's device or store the location information for later retrieval by the animal owner.

Figure 8:
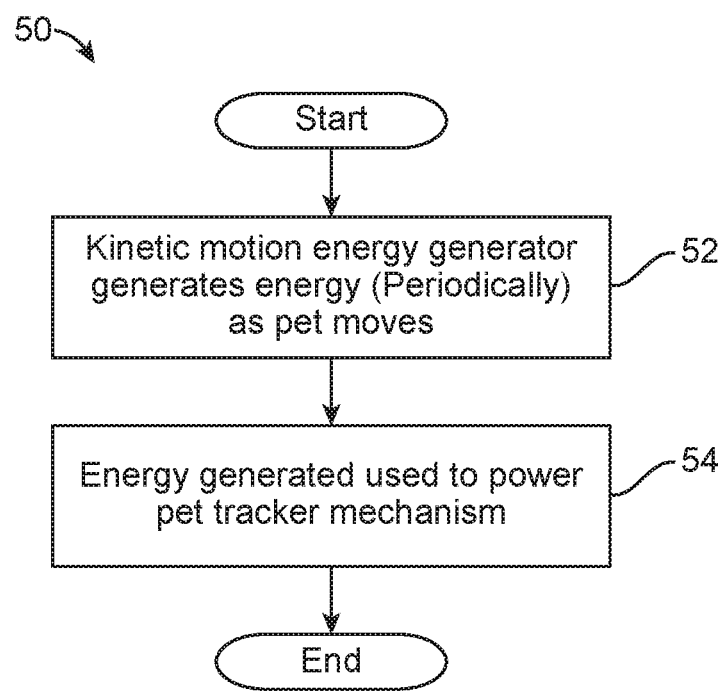
FIG. 8 illustrates a method for generating energy for the motion powered tracking device.

FIG. 8 illustrates a method 50 for generating energy for the motion powered tracking device. The kinetic motion energy generator (such as the kinetic motion energy generator 26 in FIG. 6) may generate electrical or kinetic energy during normal movement of the animal 52. In some embodiments, the energy may be generated continuously to power the elements of the tracker device 14 and/or for storage in the energy storage device. In some embodiments, the kinetic motion energy generator may periodically generate the energy as the animal moves to provide energy to a depleted energy store. In all of the embodiments, the energy generated by the kinetic motion energy generator may be used to power the tracker mechanism 54. In some embodiments, the energy may be provided to the energy store for storage and later use by the device 14.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection; however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A tracking device comprising:
   a tracking mechanism configured to track a location of an object;
   an energy generator electrically connected to the tracking mechanism;
   an energy store electrically coupled to the tracking mechanism and the energy generator, wherein the energy store is configured to power the tracking mechanism and to receive the electrical energy generated by the energy generator;
   a communication device configured to transmit the location of the object at a frequency and receive a request to track the object; and a controller configured to: (i) switch from a low energy usage mode to a high energy usage mode in response to receiving the request, wherein a frequency of transmitting the location of the object tracked by the tracking mechanism within the low energy usage mode is above zero, and (ii) further increase/decrease the frequency of transmitting the location of the object tracked by the tracking mechanism within the low energy usage mode and the high energy usage mode, based on the location of the object tracked by the tracking mechanism or a usage of the electrical energy.

2. The tracking device of claim 1, wherein in the low energy usage mode, a net energy usage of the tracking device is lower than or equal to the energy generated by the energy generator over a period of time, and wherein the net energy usage of the tracking device is determined based at least in part on a frequency and/or duration of the communication device and/or the tracking mechanism.

3. The tracking device of claim 1, wherein a frequency and/or a duration of operation of the communication device and/or the tracking mechanism is varied between the high energy usage mode and the low energy usage mode.

4. The tracking device of claim 1, wherein a frequency and/or a duration of the operation of the communication device and/or the tracking mechanism are varied based on sensor data.

5. The tracking device of claim 4, wherein the sensor data includes one or more of energy generation level, output signals of the energy generator, energy storage voltage level, movement sensor, and the location signals from the tracking mechanism.

6. The tracking device of claim 4, wherein the frequency and/or duration of the communication device and/or the tracking mechanism are further configured to increase and/or decrease based on a movement of the object, and wherein the movement is detected based on battery level, output signals from a Kinetic energy harvester, or location data from the tracking mechanism.

7. The tracking device of claim 1, wherein the energy generator is one or more of a kinetic motion energy generator, a solar powered generator, a thermo electric generator, or a wireless energy harvester.

8. The tracking device of claim 1, wherein a frequency and/or a duration of operation of the communication device and/or the tracking mechanism is set based on an output signal or energy generation of the energy generator, or an energy level in the energy storage.

9. The tracking device of claim 8, wherein the frequency and/or duration of the communication device and/or the tracking mechanism are further configured to increase and/or decrease based on the location of the object or a movement of the object, the movement being determined based on battery level change and/or output signals from the Kinetic energy harvester and/or location data from the tracking mechanism.

10. The tracking device of claim 8, wherein the frequency and/or duration of the communication device and/or the tracking mechanism are further configured to increase in response to receiving the request.

11. A method for tracking an object, comprising:
generating electrical energy using an energy generator in a tracking device;
storing the generated electrical energy in an energy store;
receiving location signals using a tracking mechanism in the tracking device, wherein the tracking mechanism is powered by the energy generator;
determining a location of the object based on the location signals;
transmitting, using a communication device, the location of the object at a frequency;
switching from a low energy usage mode to a high energy usage mode in response to receiving a request via the communication device to track the object, wherein a frequency of transmitting the location of the object tracked by the tracking mechanism within the low energy usage mode is above zero; and
increasing/decreasing the frequency of transmitting the location of the object tracked by the tracking mechanism within the low energy usage mode and the high energy usage mode based on the location of the object tracked by the tracking mechanism or a usage of the electrical energy.

12. The method of claim 11, wherein in the low energy usage mode, a net energy usage of the tracking device is lower than or equal to the energy generated by the energy generator over a period of time, and wherein the net energy usage of the tracking device is determined based at least in part on the frequency and/or duration of the communication device and/or the tracking mechanism.

13. The method of claim 11, wherein a frequency and/or a duration of operation of the communication device and/or the tracking mechanism is varied between the high energy usage mode and the low energy usage mode.

14. The method of claim 11, wherein a switching between the high energy usage mode and the low energy usage mode is based at least in part on sensor data.

15. The method of claim 14, wherein the sensor data includes one or more of energy generation level, output signals of the energy generator, energy storage voltage level, movement sensor, and location signals from the tracking mechanism.

16. The method of claim 13, wherein the frequency or duration of the communication device or tracking mechanism is increased or decreased based on the request for tracking the object, the location of the object, or a movement of the object, and wherein the movement is detected based on battery level or output signals from a Kinetic energy harvester.

17. The method of claim 11, wherein the energy generator is one or more of a kinetic motion energy generator, a solar powered generator, a thermo electric generator, or a wireless energy harvester.

18. The method of claim 11, wherein a frequency and/or duration of the communication device and/or the tracking mechanism are configured to increase and/or decrease based on the location of the object or a movement of the object, the movement being determined based on battery level change, or output signals from the Kinetic energy harvester.

19. The method of claim 11, further comprising transmitting a message from the tracking device, to a backend system to track the object and switching from the low energy usage mode to the high energy usage mode when a button on the tracking device is activated.

20. The tracking device of claim 1, wherein the communication device is configured to further transmit a message to a backend system to track the object and switch from the low energy usage mode to the high energy usage mode when a button on the tracking device is activated.

* * * * *